US010948727B2

(12) United States Patent
Min

(10) Patent No.: US 10,948,727 B2
(45) Date of Patent: *Mar. 16, 2021

(54) VIRTUAL REALITY DUAL USE MOBILE PHONE CASE

(71) Applicant: Sang Kyu Min, Seoul (KR)

(72) Inventor: Sang Kyu Min, Seoul (KR)

( * ) Notice: Subject to any disclaimer, the term of this patent is extended or adjusted under 35 U.S.C. 154(b) by 90 days.

This patent is subject to a terminal disclaimer.

(21) Appl. No.: 16/303,854

(22) PCT Filed: May 23, 2017

(86) PCT No.: PCT/KR2017/005335
§ 371 (c)(1),
(2) Date: Nov. 21, 2018

(87) PCT Pub. No.: WO2017/204523
PCT Pub. Date: Nov. 30, 2017

(65) Prior Publication Data
US 2020/0174260 A1    Jun. 4, 2020

(30) Foreign Application Priority Data
May 25, 2016  (KR) .................. 10-2016-0064028

(51) Int. Cl.
*G02B 27/01* (2006.01)
*A45C 13/02* (2006.01)
*H04M 1/05* (2006.01)

(52) U.S. Cl.
CPC .......... *G02B 27/0176* (2013.01); *A45C 13/02* (2013.01); *G02B 27/0179* (2013.01);
(Continued)

(58) Field of Classification Search
CPC ............ G02B 27/0176; G02B 27/0178; G02B 27/0179; H04M 1/05
See application file for complete search history.

(56) References Cited

U.S. PATENT DOCUMENTS

2010/0289725 A1  11/2010 Levine
2013/0126286 A1*  5/2013 Chehebar .............. A45C 13/00
190/108
(Continued)

FOREIGN PATENT DOCUMENTS

CN    102414598 A    4/2012
CN    203643689 U    6/2014
(Continued)

OTHER PUBLICATIONS

International Search Report dated Sep. 19, 2017 in corresponding International application No. PCT/KR2017/005335; 4 pages.
(Continued)

Primary Examiner — Ryan A Lubit
(74) Attorney, Agent, or Firm — Maier & Maier, PLLC

(57) ABSTRACT

A combined virtual reality and cell phone case can include: a casing fixing a cell phone body; an ocular plate configured to maintain a variable distance from the rear surface of the casing; and a screen and distance adjustment member interposed between the casing and the ocular plate, and configured to move the ocular plate between a retracted state in which the ocular plate comes into close contact with the casing and an extended state in which the ocular plate maintains a predetermined distance from the casing, thereby facilitating implementation of virtual reality.

9 Claims, 14 Drawing Sheets

(52) U.S. Cl.
CPC ......... *H04M 1/05* (2013.01); *A45C 2013/025* (2013.01); *G02B 2027/0178* (2013.01)

(56) References Cited

U.S. PATENT DOCUMENTS

| | | | | |
|---|---|---|---|---|
| 2014/0081180 | A1* | 3/2014 | Ghajar | A61B 5/11 600/595 |
| 2015/0035770 | A1* | 2/2015 | Lee | G06F 3/04883 345/173 |
| 2015/0059384 | A1* | 3/2015 | Burd | B64D 11/04 62/239 |
| 2015/0128292 | A1 | 5/2015 | Malecki et al. | |
| 2015/0241708 | A1* | 8/2015 | Watanabe | G11B 27/11 386/230 |
| 2015/0253574 | A1* | 9/2015 | Thurber | G02B 27/0172 359/630 |
| 2015/0254882 | A1 | 9/2015 | Englert et al. | |
| 2016/0041391 | A1 | 2/2016 | Van Curen et al. | |
| 2016/0041682 | A1* | 2/2016 | Nishibori | G06F 3/0487 345/173 |
| 2016/0055680 | A1* | 2/2016 | Kim | G06F 3/0416 345/633 |
| 2016/0062125 | A1* | 3/2016 | Baek | G06F 1/163 361/679.01 |
| 2017/0219797 | A1* | 8/2017 | Duan | G02B 7/22 |
| 2018/0107247 | A1* | 4/2018 | Fernandes | H04B 1/3888 |
| 2019/0146225 | A1* | 5/2019 | Min | H04M 1/0254 345/8 |

FOREIGN PATENT DOCUMENTS

| | | | | |
|---|---|---|---|---|
| CN | 203773162 | U | | 8/2014 |
| CN | 104849864 | A | | 8/2015 |
| CN | 204631357 | U | | 9/2015 |
| CN | 204832685 | | * 12/2015 | ............ G02B 27/01 |
| CN | 204832685 | U | 12/2015 | |
| CN | 204906466 | | * 12/2015 | ............ H04M 1/02 |
| CN | 204906466 | U | 12/2015 | |
| CN | 105445940 | A | 3/2016 | |
| CN | 105527714 | A | 4/2016 | |
| JP | 2009-543619 | A | 12/2009 | |
| KR | 10-2011-0131315 | A | 12/2011 | |
| KR | 10-2013-0072315 | A | 7/2013 | |
| KR | 10-2014-0078237 | A | 6/2014 | |
| KR | 10-2015-0027651 | A | 3/2015 | |
| KR | 10-2015-0050825 | A | 5/2015 | |
| KR | 10-1579130 | B1 | 12/2015 | |
| KR | 10-2016-0024168 | A | 3/2016 | |
| KR | 10-2016-0026429 | A | 3/2016 | |
| KR | 10-1616966 | B1 | 4/2016 | |
| WO | 03/015057 | A1 | 2/2003 | |
| WO | 2015/025511 | A1 | 2/2015 | |
| WO | 2015-051660 | A1 | 4/2015 | |
| WO | WO-2017133112 | A1 * | 8/2017 | ............ H04M 1/02 |

OTHER PUBLICATIONS

International Search Report dated Aug. 24, 2017, in corresponding International application No. PCT/KR2017/004466; 4 pages.
ZDNET.CO.KR; ZDNet Korea news print; [online] URL; http://www.zdnet.co.kr/news/news_view.asp? artice_id=20130104095402; Jan. 4, 2013; search on Oct. 22, 2018; 3 pages.
Office Action dated Apr. 28, 2020 in corresponding Chinese Application No. 201780031853.3; 15 pages including English-language translation.
Search Report dated Mar. 24, 2020 in corresponding Chinese Application No. 201780031853.3; 5 pages including English-language translation.
Office Action dated May 7, 2020 in corresponding Chinese Application No. 201780026264.6; 26 pages including English-language translation.
Search Report dated Apr. 26, 2020 in corresponding Chinese Application No. 201780026264.6; 2 pages.
Search Report dated Feb. 12, 2020 in corresponding European Application No. 17803042.5; 8 pages.
Search Report dated Oct. 15, 2019 in corresponding European Application No. 17789924.2; 9 pages.

* cited by examiner

VIRTUAL REALITY DUAL USE MOBILE PHONE CASE

FIELD

The present invention relates to a cell phone case for implementing a virtual reality function, and more specifically to a cell phone case by which a module configured to enable virtual reality to be experienced is provided in an integrated form.

BACKGROUND

Virtual reality is a human-computer interface that artificially creates a specific environment or situation and enables a human, who is using virtual reality, to feel as if he or she were interacting with an actual surrounding situation or an actual environment. The term virtual reality is used interchangeably with the terms artificial reality, cyberspace, virtual worlds, virtual environment, synthetic environment, and artificial environment.

The purpose of use of virtual reality is to enable a human to view and manipulate an environment that is difficult to experience in an everyday situation without directly experiencing it as if he or she were present in the environment. Application fields of virtual reality include education, remote manipulation, remote satellite surface exploration, exploration data analysis, and scientific visualization.

Recently, as smartphones have become popularized, virtual reality has attracted attention again. Representative examples of virtual reality include Gear VR, which was manufactured by Samsung in association with Oculus, LG's "G3 VR," and Google's Cardboard. These products can interact with smartphones to thus enable virtual reality to be experienced, and the prices thereof are cheaper than those of existing VR devices.

DISCLOSURE

Summary

The present invention provides a cell phone case in which a virtual reality function is included.

The present invention provides a cell phone case that does not require a separate device to be carried and that can immediately implement a virtual reality (VR) function at a desired time and a desired location.

According to an exemplary embodiment of the present invention, there is provided a combined virtual reality and cell phone case including: a casing fixing a cell phone body; an ocular plate configured to maintain a variable distance from the rear surface of the casing; and a screen and distance adjustment member interposed between the casing and the ocular plate, and configured to move the ocular plate between a retracted state in which the ocular plate comes into close contact with the casing and an extended state in which the ocular plate maintains a predetermined distance from the casing.

The combined virtual reality and cell phone case according to the present invention can be used in the state of having been integrated with a cell phone so that the combined virtual reality and cell phone case can be carried. The combined virtual reality and cell phone case can provide a physical structure for implementing virtual reality to the cell phone, and can implement a virtual reality function regardless of space and time.

Although the usefulness of virtual reality is increased as the number of functions that can be implemented by a virtual reality function increases, it does not satisfy such needs if it is necessary to carry a large-sized VR device as in the conventional technology. In contrast, in the present invention, when an ocular plate is in a separated state, a virtual reality function can be implemented using the display of a cell phone body that is oriented rearward.

Accordingly, a structure in which the ocular plate can be maintained at a variable distance from the cell phone may be formed by using the screen and distance adjustment member. The screen and distance adjustment member may include a plurality of screen boxes configured to slide backward and be fixed while being laid over each other and, thus, may also implement the light blocking screen function of preventing external light from entering.

Furthermore, since the cell phone body is mounted inside the casing in an invertible manner, the cell phone body may be normally used for a general purpose, and then the cell phone body may be inverted and directed backward in order to perform a virtual reality function. For reference, in the present specification, the casing does not need to accommodate all the side surfaces of the cell phone body, and may accommodate part of the side surfaces. The cell phone case may include a front cover, and may not do it.

The cell phone body may include one or more displays. After the virtual reality display of the displays has been oriented rearward, various types of virtual reality functions may be implemented using the ocular plate in a separated state. For example, although various effects may be implemented by dividing the virtual reality display into left and right parts or upper and lower parts and employing a pair of ocular lenses for a viewing angle of 180 or 360 degrees, as in the conventional cardboard, a polarizing glasses method in which polarizing lenses are mounted on an ocular plate, a shutter glasses method in which left and right ocular lenses are opened and closed in an ocular plate at time intervals, etc. may be also applied to the present invention. Additionally, various types of combinations of displays and lenses for the implementation of virtual reality or three-dimensional display may be implemented.

The ocular plate needs to maintain a retracted state in which the ocular plate comes into close contact with the cell phone body while a virtual reality function is not used, and needs to maintain an extended state in which the ocular plate is spaced apart from the cell phone body by a predetermined distance while a virtual reality function is used. For this purpose, the ocular plate needs to form a variable distance without being fastened to the cell phone body. For this purpose, the screen and distance adjustment member can move an ocular plate between the retracted state and the extended state using various methods.

For example, the screen and distance adjustment member may be implemented using a plurality of screen boxes. The extended state between the display of the inverted cell phone body and the ocular plate can be maintained using the mutual friction and fastening force of the screen boxes, and external light can be blocked. Alternatively, the screen and distance adjustment member may separately include: a distance adjustment member interposed between the casing and the ocular plate and configured to move the ocular plate between the retracted state and the extended state; and a light blocking screen interposed between the casing and the ocular plate and configured to prevent external light from entering in the extended state of the ocular plate.

When the screen and distance adjustment member is implemented using screen boxes, the screen boxes may be each formed in a single-wall structure, or may be each provided in a double-wall structure in order to provide a firm support structure and a reduction in weight. In other words, in order to implement the double-wall structure, each of the screen boxes may include an inner wall and an outer wall, and a minimum space may be formed between the inner and outer walls.

Furthermore, in order to deal with heat or electromagnetic waves generated from the virtual reality display, vents may be formed in the screen boxes. However, light may enter directly from the outside through the vents. Accordingly, in each of the screen boxes having a double-wall structure, a first vent is formed in the inner wall thereof, a second vent is formed in the outer wall thereof, and the first and second vents are formed not to overlap each other, i.e., in a non-overlap manner, thereby preventing light from entering directly from the outside.

Since it is sufficient if the screen and distance adjustment member effectively blocks external light in order to increase an immersion level, the screen and distance adjustment member may completely block a space between the main body and the ocular plate, or may partially open the space as long as its intrinsic function is not damaged.

Furthermore, in order to implement a virtual reality function in a more realistic fashion, fastening members configured to fasten the cell phone in its extended state to the face of a user may be further included. The fastening members may be provided in various forms, such as the earloops of a common mask, the temples of glasses, a helmet mount, an elasticity band, etc.

The cell phone case according to the present invention may further include a rear cover configured to selectively open and close the rear surfaces of the ocular plate and the casing in the retracted state of the ocular plate. The rear cover is used for the purpose of protecting the ocular plate, and may further include a smell generation unit configured to generate a specific smell in connection with the content of virtual reality or a wind generation unit configured to generate a wind in connection with the content of virtual reality.

The combined virtual reality and cell phone case according to the present invention is configured such that a common cell phone and a virtual reality module are integrated with each other and are coupled to each other in a portable structure, so that the virtual reality cell phone has no inferiority as a common cell phone and can implement a virtual reality function regardless of location and time. The number of functions that can be implemented by a virtual reality function can increase, and also it is not necessary to carry a separate auxiliary device, unlike in the conventional technology, thereby improving the convenience of a user.

Furthermore, the cell phone body is mounted inside the casing in an invertible manner, so that a single display can be used both as a general monitor and as a virtual reality monitor.

Moreover, a structure in which the ocular plate is maintained at a variable distance from the cell phone can be constructed by the screen and distance adjustment member and also the light blocking screen function of preventing external light from entering can be implemented by the same structure, so that an overall structure can be simplified and both high-quality sliding movement and firmness can be acquired.

These features can be made to produce further improved effects by forming the screen boxes in double-wall structures, and the convenience of a user can be further increased by forming the vents in a non-overlap manner and also providing the lightweight structures.

BEST MODE

Although preferred embodiments of the present invention will be described in detail below with reference to the accompanying drawings, the present invention is not limited or restricted by the embodiments. For reference, in the present description, the same reference symbols refer to substantially the same components. Under this rule, items shown in other drawings may be described through citation. A description determined to be apparent to those skilled in the art or repeated description may be omitted.

Figure 1:
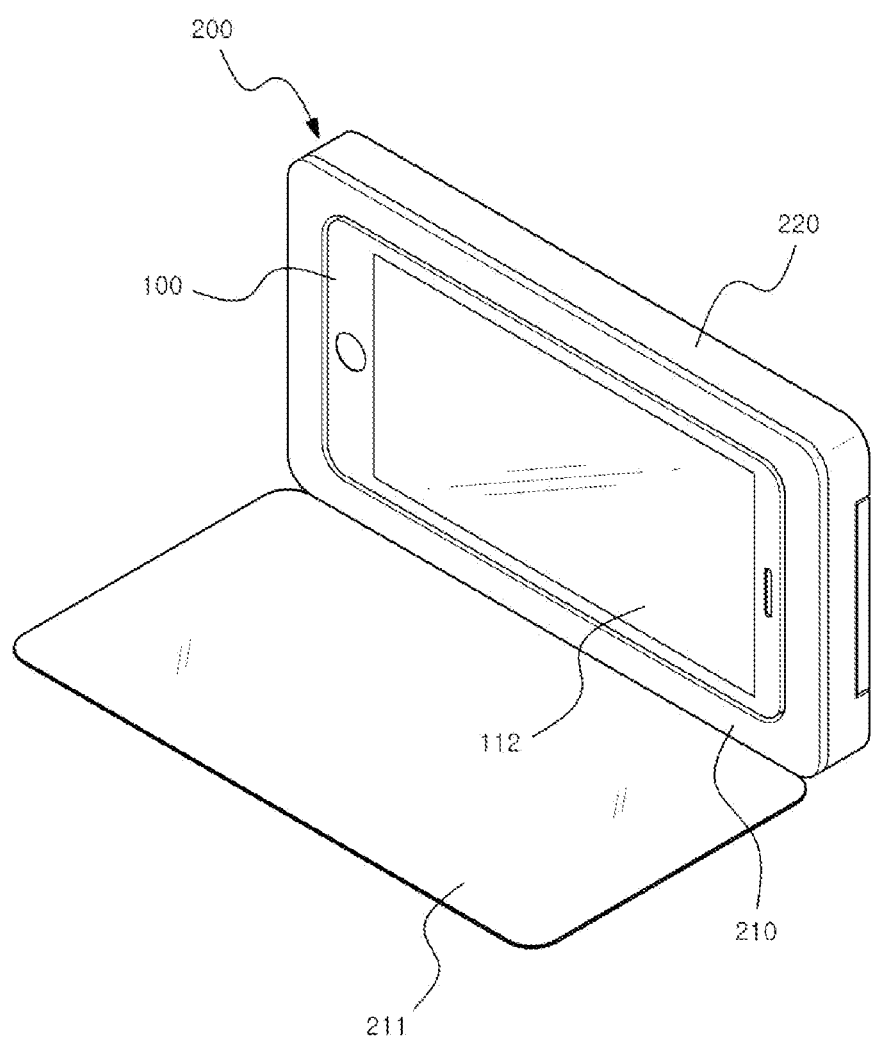
FIG. 1 is a perspective view of a combined virtual reality and cell phone case according to an embodiment of the present invention.
Figure 2:
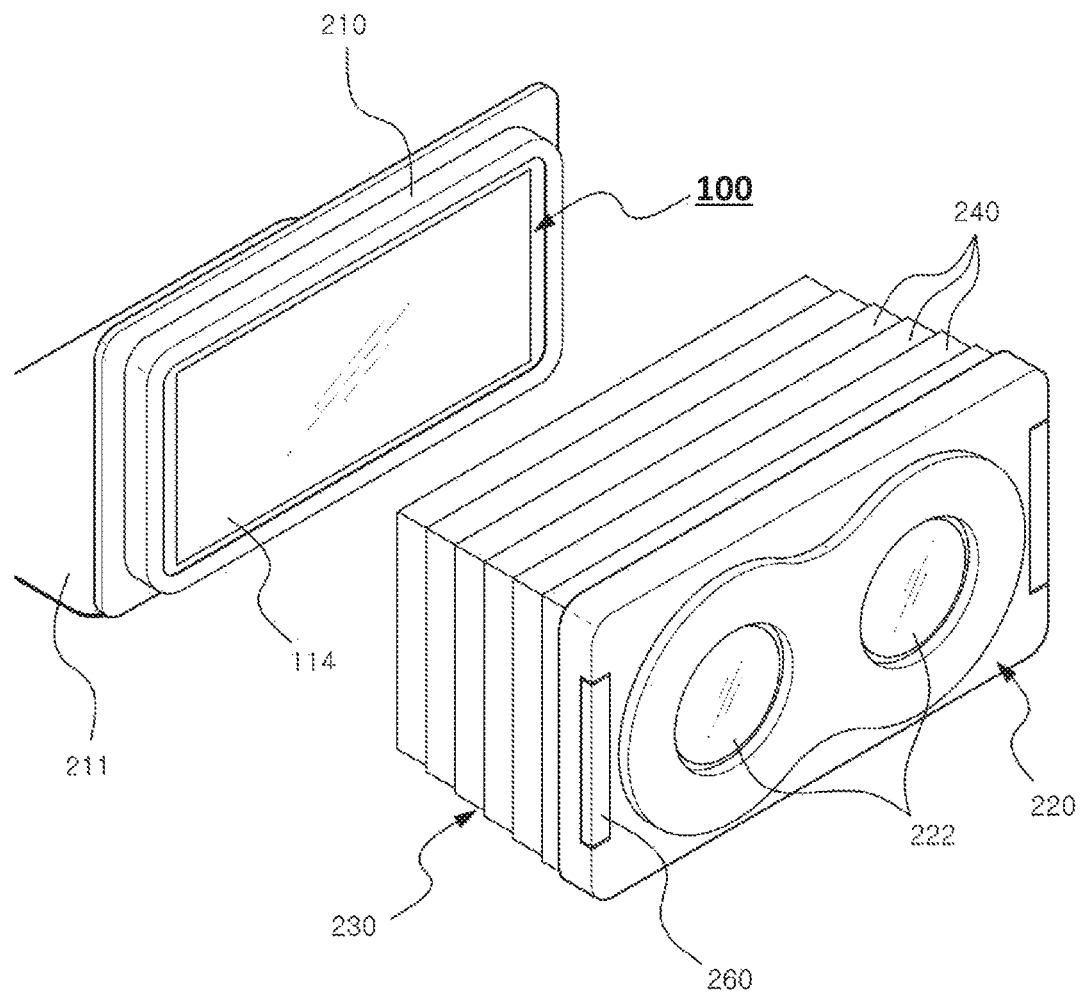
FIG. 2 is an exploded perspective view showing the combined virtual reality and cell phone case of FIG. 1 from the rear surface thereof.
Figure 3:
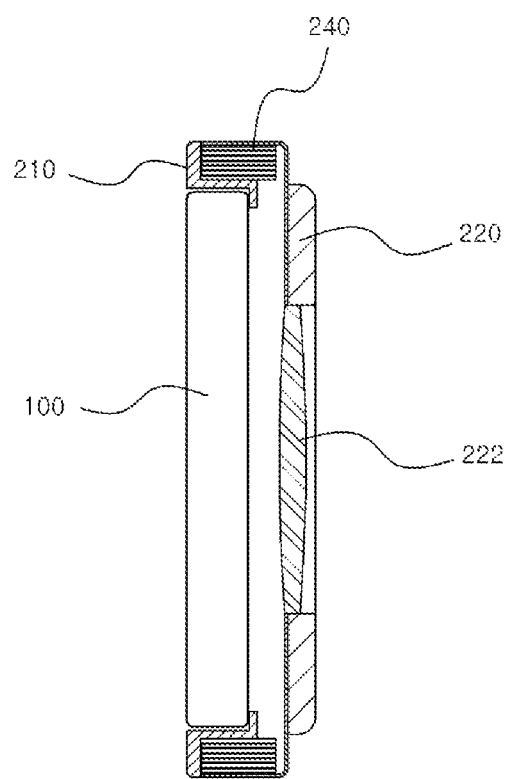
FIG. 3 is a sectional view of the combined virtual reality and cell phone case of FIG. 1 in a retracted state.
Figure 4:
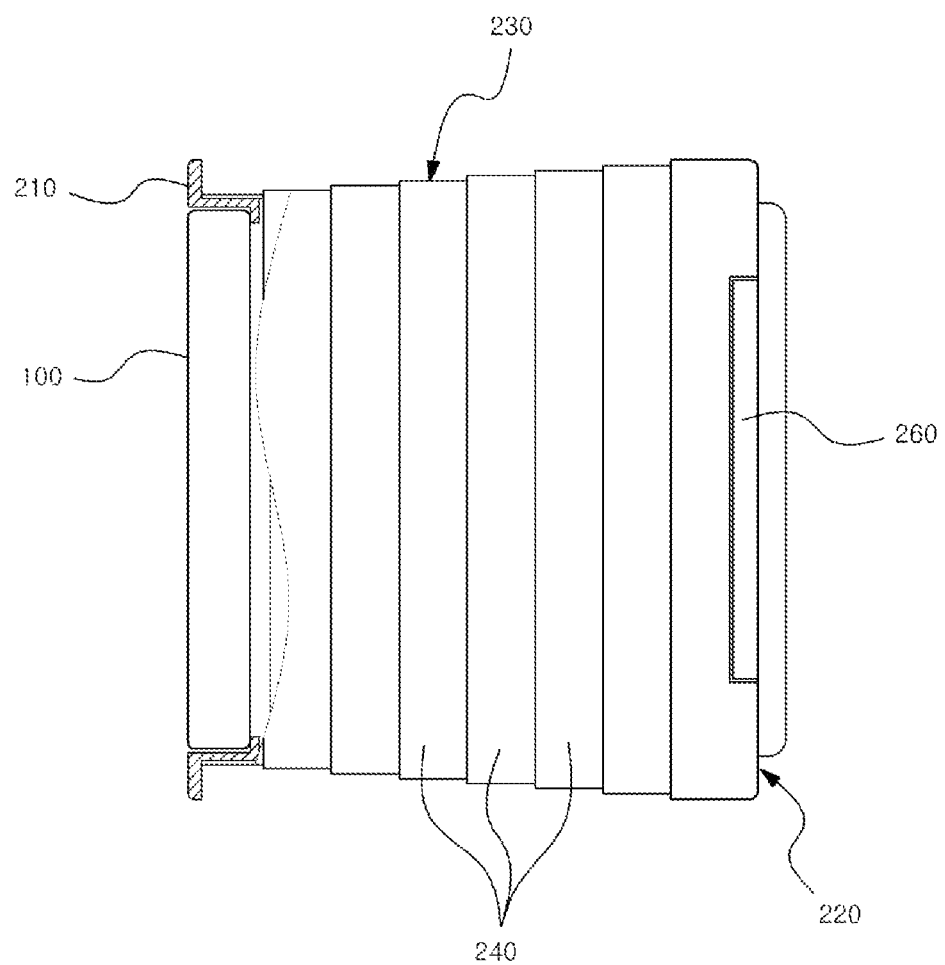
FIG. 4 is a sectional view of the combined virtual reality and cell phone case of FIG. 1 in an extended state.

FIG. 1 is a perspective view of a combined virtual reality and cell phone case and a cell phone in it, FIG. 2 is an exploded perspective view showing the combined virtual reality and cell phone case and the cell phone of FIG. 1 from the rear surface thereof, FIG. 3 is a sectional view of the combined virtual reality and cell phone case and the cell phone of FIG. 1 in a retracted state, FIG. 4 is a sectional view of the combined virtual reality and cell phone case and the cell phone of FIG. 1 in an extended state.

Referring to FIGS. 1 to 4, a combined virtual reality and cell phone case 200 accommodates a cell phone body 100. The cell phone case 200 includes a casing 210, an ocular plate 220, and a screen and distance adjustment member 230.

The cell phone body 100 includes a main display 112 disposed on the front surface thereof and a virtual reality display 114 disposed on the rear surface thereof, and may perform the making of a basic call, the running of an application, etc. through the manipulation of the front main display 112 or another button, or the like. Furthermore, the back virtual reality display 114 may provide a virtual reality function to a user in conjunction with the ocular plate 220. The virtual reality display 114 may be operated through the manipulation of a user, the movement detection of the ocular plate 220, or the like.

The casing 210 may accommodate the cell phone body 100, and may include a through portion configured to open the virtual reality display 114 in the back thereof. The through portion may include one hole or two or more holes. As shown in the drawings, a front cover 211 may be formed on one side of the front surface of the casing 210, as in other cell phone cases.

The ocular plate 220 includes a pair of ocular lenses 222, and a user can view an image, displayed on the main display 112 which is reversed, via the ocular lenses 222. The ocular lenses 222 allow their focus to be adjusted through fine rotational manipulation, and also allow their lateral interval to be adjusted in accordance with the distance between the eyes. Additionally, a cushion corresponding to the shape of a face, a light blocking structure configured to additionally block light, or the like may be added around the ocular lenses 222.

The screen and distance adjustment member 230 may be formed on the rear surface of the casing 210, and include a plurality of screen boxes 240 configured to slide and be fixed in a longitudinal direction while being laid over each other. The screen boxes 240 may be formed in rectangular shapes corresponding to the shape of the cell phone, in elliptical shapes, or in shapes each having an 8-shaped appearance conforming to the shape of the eyes.

In the screen and distance adjustment member 230, the screen boxes 240 slide while undergoing friction, like a metal antenna, and thus they may be stopped at desired locations and may maintain a variable distance. Furthermore, the screen boxes 240 can block four sides from the outside, and, thus, can effectively block external light.

Figure 5:
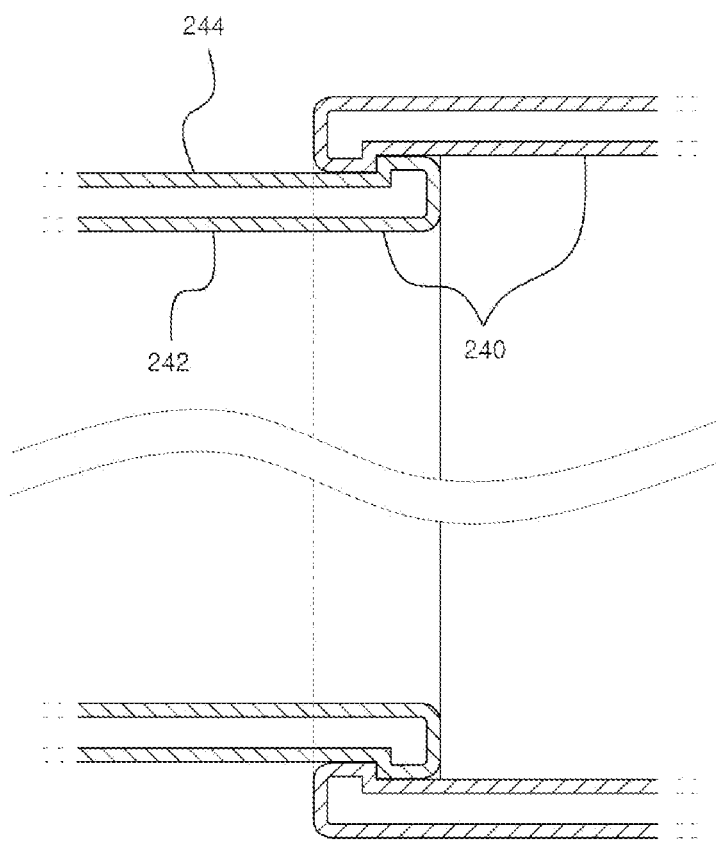
FIG. 5 is a sectional view illustrating the screen and distance adjustment member of the combined virtual reality and cell phone case according to the embodiment of the present invention.

FIG. 5 is a sectional view illustrating the screen and distance adjustment member of the combined virtual reality and cell phone case according to the embodiment of the present invention.

Referring to FIG. 5, the screen boxes 240 constituting the screen and distance adjustment member 230 may be each formed in a double-wall structure. Each of the screen boxes 240 having a double-wall structure includes an inner wall 242 and an outer wall 244, and the inner wall 242 and the outer wall 244 may maintain a distance over an overall or partial area. The screen boxes 240 each have a double-wall structure, and thus have a considerably lower weight for the same thickness than screen boxes each having a single-wall structure, and also the screen boxes 240 can form a firm structure.

FIG. 6 is a partially enlarged sectional view illustrating the screen and distance adjustment member of the combined virtual reality and cell phone case according to the embodiment of the present invention.

Figure 6A:
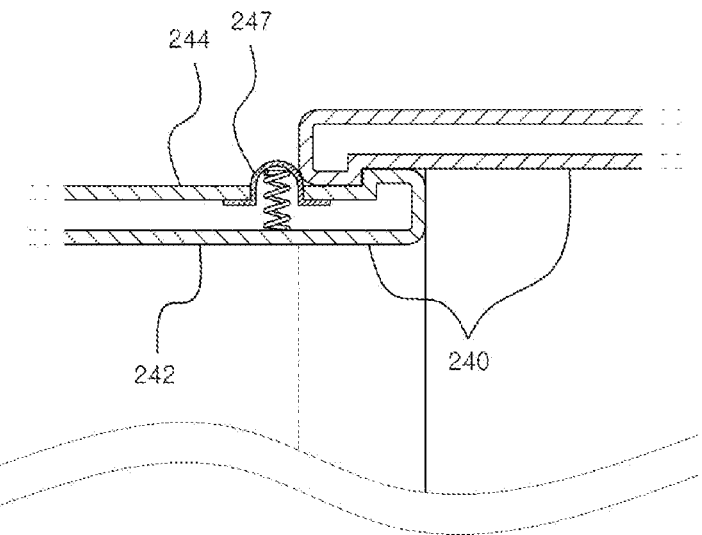
FIG. 6(a) is a partially enlarged sectional view illustrating the screen and distance adjustment member of the combined virtual reality and cell phone case according to the embodiment of the present invention.

Referring to FIG. 6(a), each of the screen boxes 240 may further include an elastic protrusion 247 protruding from the inner wall of the screen box 240 in order to maintain a retracted state or extended state. In the extended state in which the screen boxes 240 have been extended, the elastic protrusion 247 supports an end of another screen box 240, thereby fastening the screen boxes 240 in order to prevent the screen boxes 140 from being laid over each other under force equal to or lower than predetermined force.

Figure 6B:
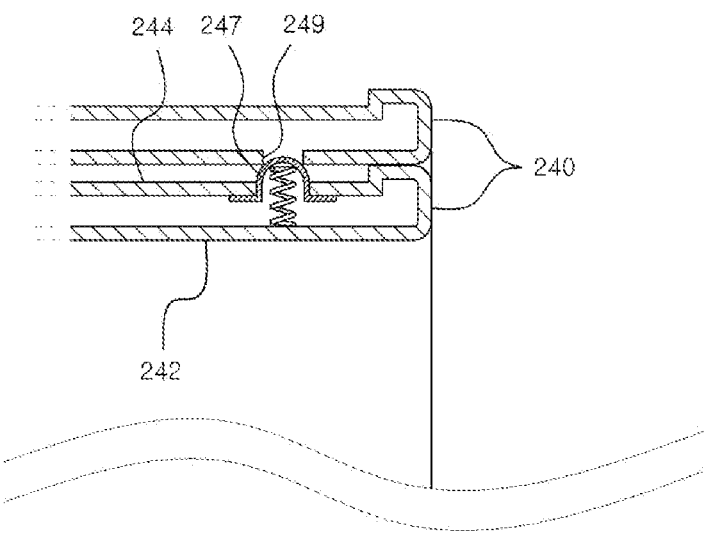
FIG. 6(b) is another partially enlarged sectional view illustrating the screen and distance adjustment member of the combined virtual reality and cell phone case according to the embodiment of the present invention.

Furthermore, referring to FIG. 6(b), in the retracted state in which the screen boxes 240 have been laid over each other, the elastic protrusion 247 is stuck in a protrusion reception hole 249 formed in another screen box 240, thereby fastening the screen boxes 240 in order to prevent the screen boxes 240 from sliding into each other also under force equal to or lower than predetermined force.

Although the elastic protrusion 247 is formed in a structure in which the elastic protrusion 247 protrudes from the inner wall 242 of the screen box 240 in the present embodiment, the elastic protrusion 247 may be formed in a structure in which the elastic protrusion 247 protrudes from the outer wall or both from the inner wall and from the outer wall. The elastic protrusions 247 may be designed to be spaced apart from each other in a direction perpendicular to extension and retraction directions so as not to interfere with mutual operation. Furthermore, the elastic protrusions 247 may be elastically supported by their own elasticity, as in the case of leaf springs, rather than being supported by springs.

Figure 7:
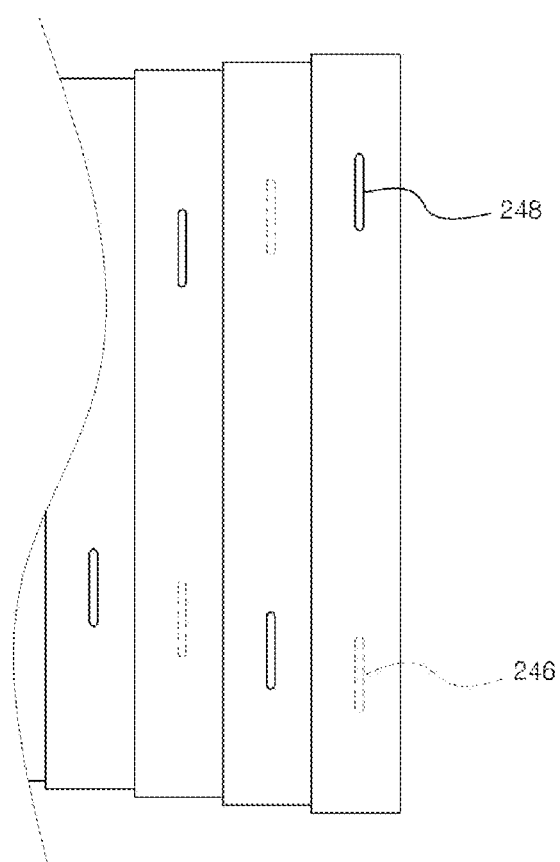
FIG. 7 is a partially enlarged side view illustrating the screen and distance adjustment member of the combined virtual reality and cell phone case according to the embodiment of the present invention.

FIG. 7 is a partially enlarged side view illustrating the screen and distance adjustment member of the combined virtual reality and cell phone case according to the embodiment of the present invention.

Referring to FIG. 7, the screen boxes 240 of the screen and distance adjustment member 230 may be each formed in a double-wall structure, as illustrated in FIG. 5. When the screen boxes 240 of the screen and distance adjustment member 230 are each formed in a double-wall structure, a reduction in weight can not only be implemented, but other effects can be also achieved. For example, when vents are formed in the screen and distance adjustment member 230, each first vent 246 and a corresponding second vent 248 are formed not to overlap each other, thereby preventing light from entering from the outside.

More specifically, in each of the screen boxes 240 having a double-wall structure, a first vent 246 is formed in an inner wall 242 and a second vent 248 is formed in an outer wall 244 so that the first vent 246 and the second vent 248 do not overlap each other, i.e., in a non-overlap manner, as shown the drawing, thereby preventing light from entering from the outside.

Referring back to FIGS. 2 to 4, the screen and distance adjustment member 230 is interposed between the casing 210 and the ocular plate 220. While the ocular plate 220 remains in an extended state, external light can be prevented from entering.

In the present embodiment, the sizes of the screen boxes 240 increase gradually. The sizes may increase and then decrease in a front-back direction. Conversely, the sizes of the screen boxes may decrease gradually. Alternatively, the sizes of the screen boxes may increase and then decrease. The opposite case is also possible.

Furthermore, although the screen boxes 240 preferably block external light on four sides in order to increase an immersion level, they may be allowed to partially block a space between the cell phone body 100 and the ocular plate 220 as long as the immersion level is not seriously degraded even when the space is partially opened.

Figure 8:
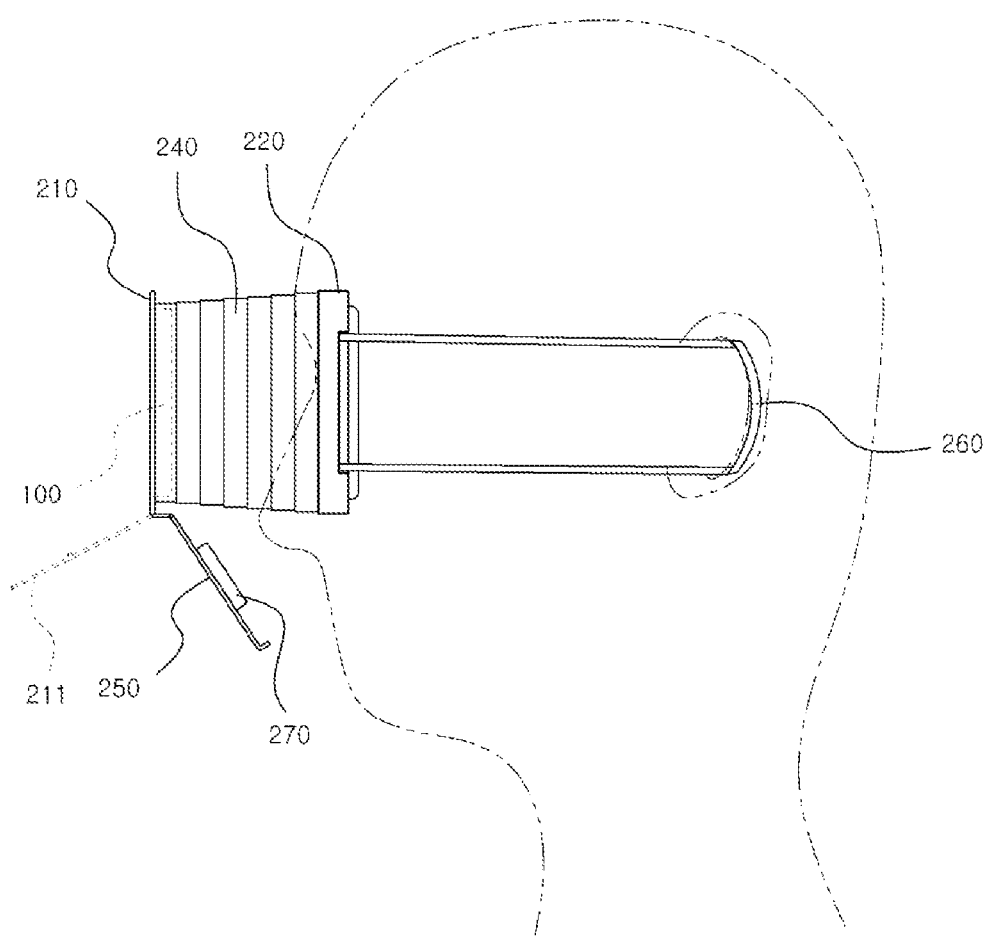
FIG. 8 is a side view illustrating the combined virtual reality and cell phone case according to an embodiment of the present embodiment.

FIG. 8 is a side view illustrating the combined virtual reality and cell phone case according to an embodiment of the present embodiment.

Referring to FIG. 8, the combined virtual reality and cell phone case may accommodate the cell phone body 100, and include a casing 210, an ocular plate 220, and a screen and distance adjustment member 230 like the previous embodiment, and may further include a rear cover 250.

The rear cover 250 may be used for the purpose of protecting the ocular plate 220. While a user is wearing the virtual reality cell phone, the rear cover 250 may be used in the state of drooping from the bottom surface of the casing 210 or ocular plate 220.

When the rear cover 250 is formed on the cell phone body 100, the ocular plate 220 can not only be protected, but a smell generation unit configured to generate a specific smell in connection with the content of virtual reality or a wind generation unit 270 configured to generate a wind in connection with the content of virtual reality may be also formed additionally.

Furthermore, in order to implement a virtual reality function in a more realistic fashion, fastening members 260 configured to fasten the cell phone in its extended state to the face of a user may be further included. The fastening members 260 may be provided in the form of the earloops of a common mask. The fastening members 260 may be normally prepared on both sides of the ocular plate 220, and may be spread backward and fitted around the ears of a user for the convenience of the user. Alternatively, it will be apparent that the fastening members 260 may be formed on the cell phone body 100.

The fastening members 260 may be provided in the form of the temples of glasses, or may be provided in the form of an elastic band that is fastened to the head of a user.

Figure 9:
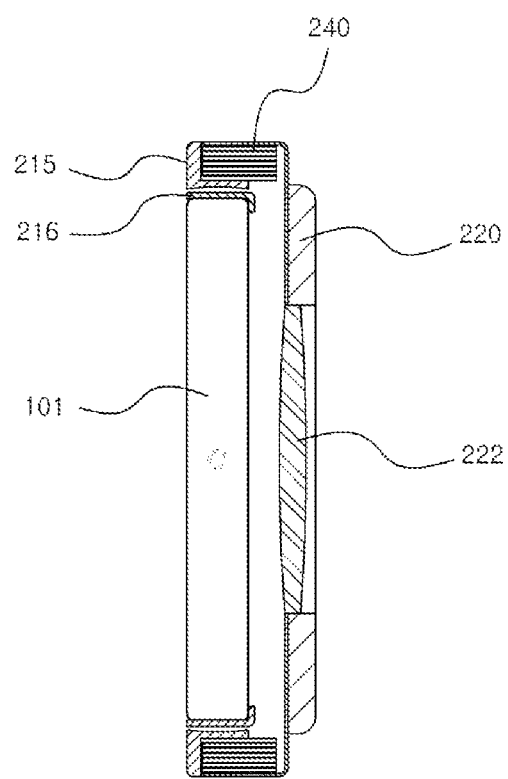
FIG. 9 is a sectional view of a combined virtual reality and cell phone case according to another embodiment of the present embodiment in a retracted state.
Figure 10:
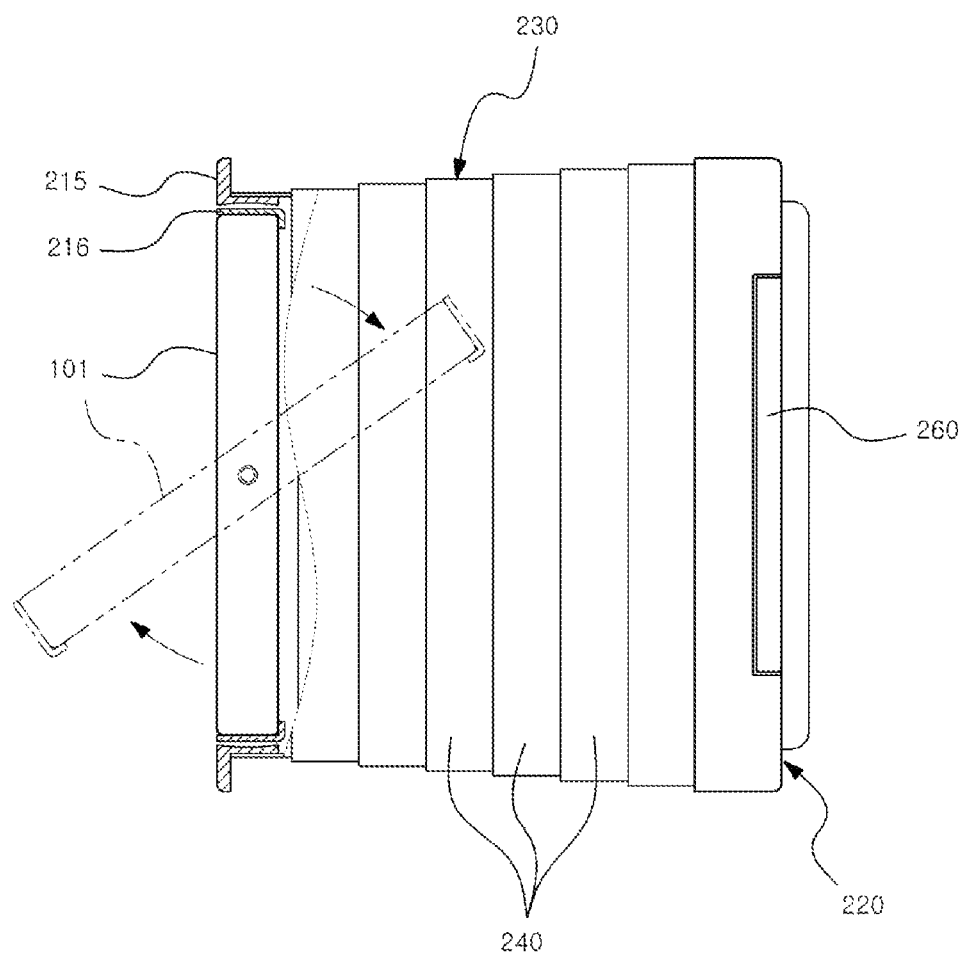
FIG. 10 is a sectional view of the combined virtual reality and cell phone case of FIG. 9 in an extended state.

FIG. 9 is a sectional view of a combined virtual reality and cell phone case and a cell phone according to another embodiment of the present embodiment in a retracted state, FIG. 10 is a sectional view of the combined virtual reality and cell phone case and the cell phone of FIG. 9 in an extended state.

Referring to FIGS. 9 and 10, the casing 210 includes an inner frame 216 configured to directly accommodate the cell phone body 101 and a main frame 215 configured to accommodate the inner frame 216 so that the inner frame 216 can be reversed. Unlike in the previous embodiment, a virtual reality function may be implemented using the main display 112 even when the cell phone body 101 does not include a virtual reality display. For this purpose, the inner frame 216 configured to accommodate the cell phone body 101 may be reversibly mounted inside the main frame 215.

In other words, when the ocular plate 220 is in a tight contact state, the main display 112 of the cell phone body 101 may be oriented forward. In contrast, when the ocular plate 220 is in a separated state, the cell phone body 101 may be reversed along with the inner frame 216, and the main display 112 of the reversed cell phone body 101 may be oriented rearward, thereby being used for the purpose of implementing a virtual reality function.

The cell phone body 101 may be rotatably mounted inside the main frame 215 by being accommodated in the inner frame 216 of the casing 210, and the main display 112 may be fastened in the state of being oriented forward or rearward in response to the rotation of the cell phone body 101 and the inner frame 216.

The direction of the main display 112 may be detected through the rotated state of the cell phone body 101, and the virtual reality function may be automatically actuated based on the manipulation of a user, the direction of the cell phone body 101, or the detection of the movement of the ocular plate 220.

Figure 11:
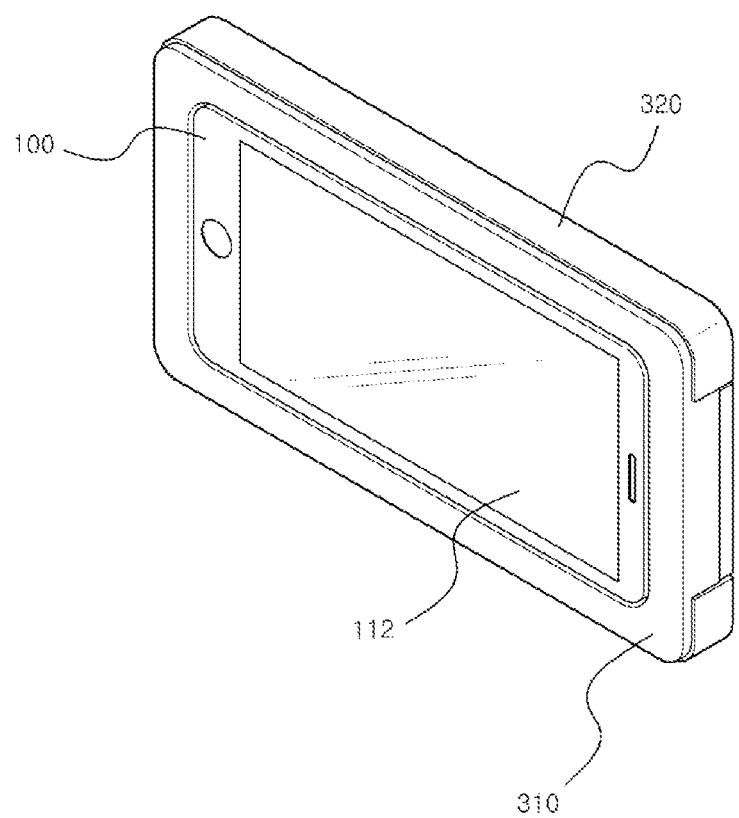
FIG. 11 is a perspective view of a combined virtual reality and cell phone case according to another embodiment of the present embodiment.
Figure 12:
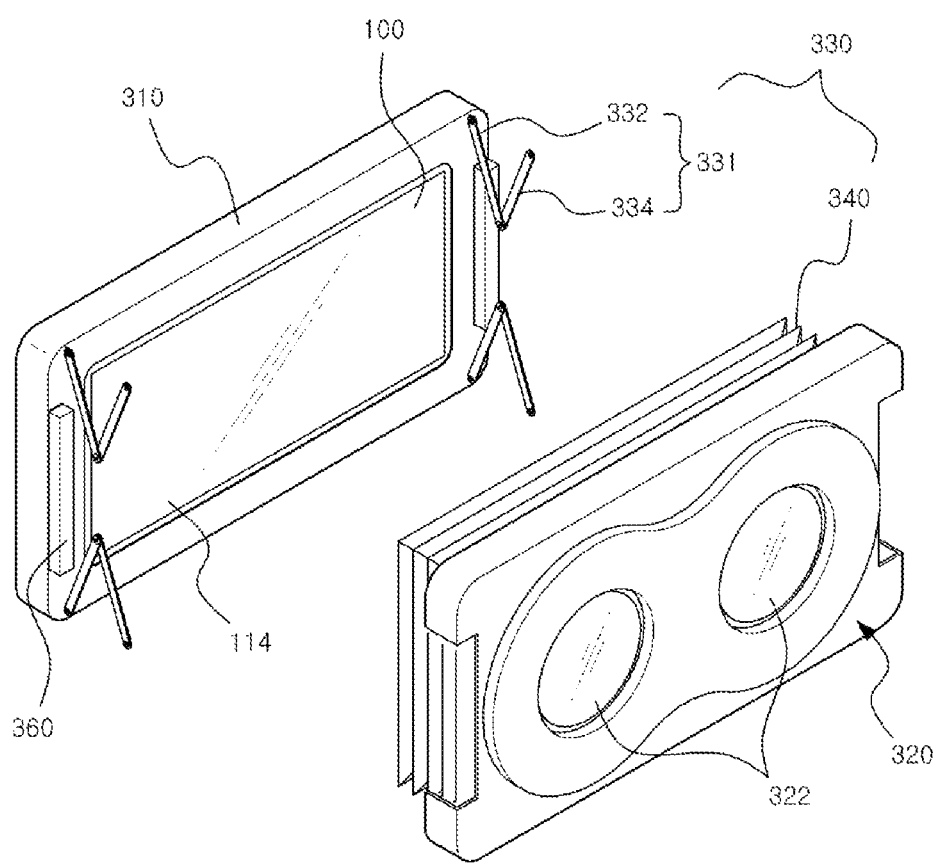
FIG. 12 is an exploded perspective view showing the combined virtual reality and cell phone case of FIG. 11 from the rear surface thereof.
Figure 13:
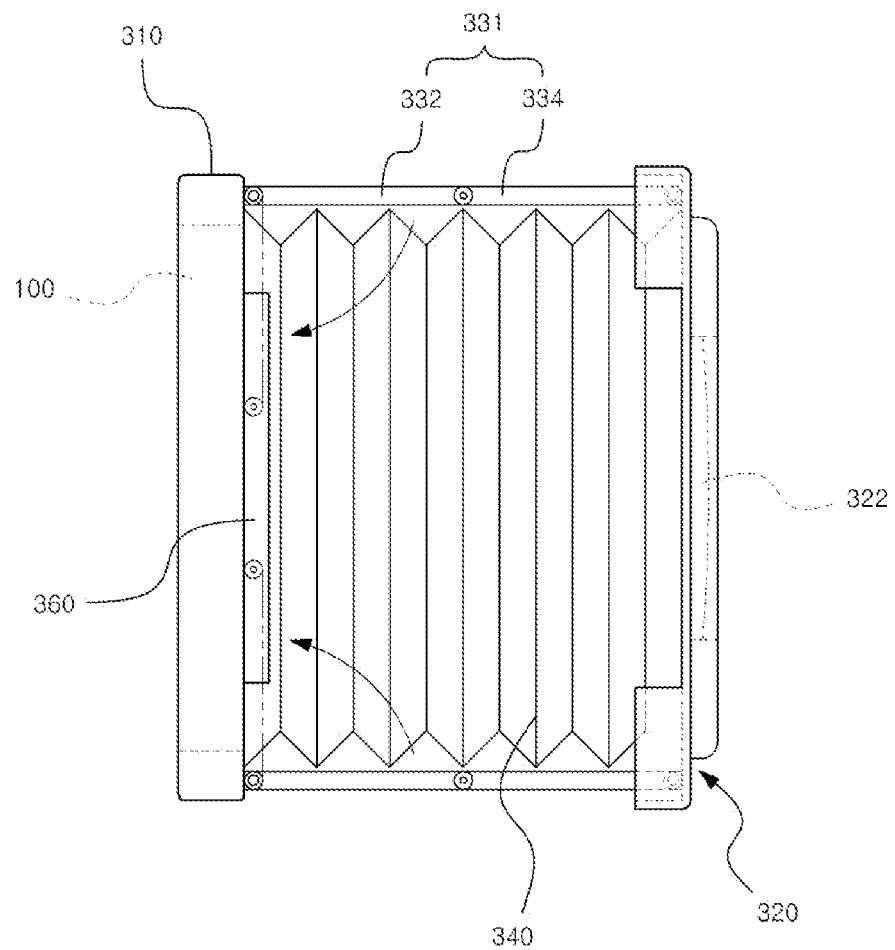
FIG. 13 is a side view of the combined virtual reality and cell phone case of FIG. 11.

FIG. 11 is a perspective view of a combined virtual reality and cell phone case and a cell phone in it according to another embodiment of the present embodiment, FIG. 12 is an exploded perspective view showing the combined virtual reality and cell phone case of FIG. 11 from the rear surface thereof, FIG. 13 is a side view of the combined virtual reality and cell phone case of FIG. 11.

Referring to FIGS. 11 to 13, the combined virtual reality and cell phone case 300 includes a casing 310 accommodating a cell phone body 100, an ocular plate 320, and a screen and distance adjustment member 330.

The cell phone body 100 includes a main display 112 disposed on the front surface thereof and a virtual reality display 114 disposed on the rear surface thereof, and may perform the making of a basic call, the running of an application, etc. through the manipulation of the front main display 112 or another button, or the like. Furthermore, the back virtual reality display 114 may provide a virtual reality function to a user in conjunction with the ocular plate 320. The virtual reality display 114 may be operated through the manipulation of a user, the movement detection of the ocular plate 320, or the like.

The cell phone body 100 cannot be reversed inside the casing 310 in the present embodiment. However, when a casing 310 is implemented using an inner frame and a main frame, as shown in FIGS. 9 and 10, a cell phone body may be reversed.

The ocular plate 320 includes a pair of ocular lenses 322, and a user can view an image, displayed on the main display 112 which is reversed, via the ocular lenses 322. The ocular lenses 322 allow their focus to be adjusted through fine rotational manipulation, and also allow their lateral interval to be adjusted in accordance with the distance between the eyes. Additionally, a cushion corresponding to the shape of a face, a light blocking structure configured to additionally block light, or the like may be added around the ocular lenses 322.

The screen and distance adjustment member 330 includes a distance adjustment member 331, and a light blocking screen 340. The distance adjustment member 331 includes first links 332 and second links 334 configured such that each of the first links 332 and a corresponding one of the second links 334 are connected to each other at their inner ends. The outer ends of the first links 332 are rotatably connected to the casing 310, and the outer ends of the second links 334 are rotatably connected to the ocular plate 320.

Four combinations, each including the first link 332 and the second link 334, connect the ocular plate 320 to the four corners of the casing 310. The first links 332 and the second links 334 move the ocular plate 320 between an extended state and a retracted state while being spread in rectilinear shapes or bent in V shapes.

Figure 14:
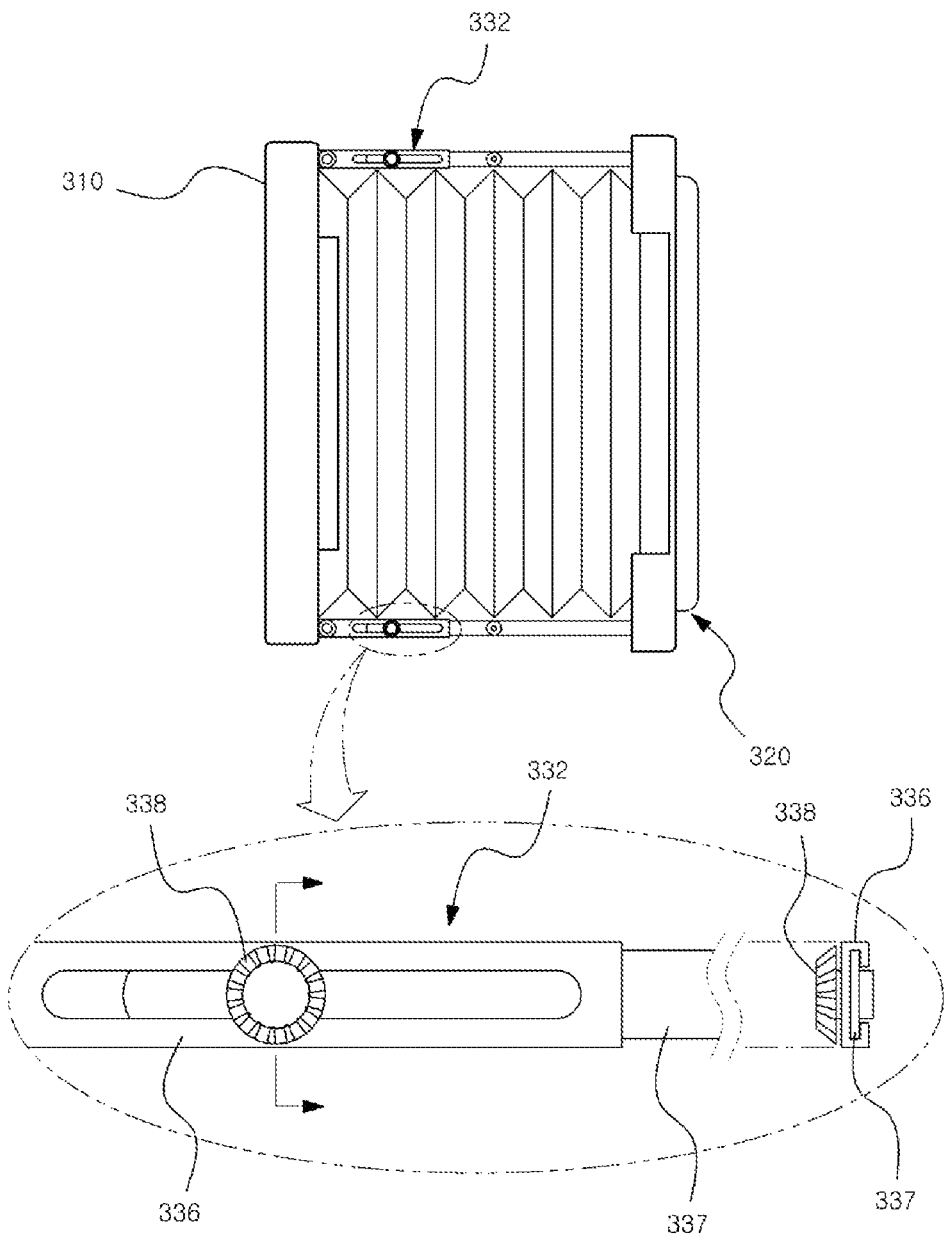
FIG. 14 is a partially enlarged sectional view illustrating the distance adjustment member of a combined virtual reality and cell phone case according to the other embodiment of the present invention.

FIG. 14 is a partially enlarged sectional view illustrating the distance adjustment member of a combined virtual reality and cell phone case according to the other embodiment of the present invention.

Referring to FIG. 14, a first link 332 may be provided to be adjusted and fixed in length. For this purpose, the first link 332 includes at least two rods 336 and 337 configured such that the overlapping length thereof can be adjusted. An elongated hole formed in a longitudinal direction is formed in at least one of the rods 336 and 337. A fine adjustment screw 338 is mounted in the elongated hole, and thus the overlapping length of the rods 336 and 337 can be adjusted and fixed.

Additionally, a plurality of stop protrusions may be formed on the elongated hole at predetermined intervals, and thus the overlapping length of the rods can be adjusted through movement between the stop protrusions.

Fine distance adjustment is enabled by adjusting the overlapping distance when necessary, as described above. The angle of the ocular display and the misalignment of the display with a vertical axis can be also adjusted by independently adjusting the four link combinations.

Referring back to FIGS. 12 and 13, the light blocking screen 340 is interposed between the casing 310 and the ocular plate 320, and may prevent external light from entering while the ocular plate 320 is in an extended state.

In the present embodiment, the light blocking screen 340 is formed in a bellows shape. Both ends of the light blocking screen 340 are fastened to the casing 310 and the ocular plate 320, respectively, and thus a substantially complete darkroom is formed. However, the light blocking screen 340 may be made of a material having excellent elasticity, rather than being formed in a bellows form. The light blocking screen 340 may be designed such that it is normally fastened to any one side and is then fastened to the other side in an extended state.

Furthermore, although the screen boxes 340 preferably block external light on four sides in order to increase an immersion level, they may be allowed to partially block a space between the casing 310 and the ocular plate 320 as long as the immersion level is not seriously degraded even when the space is partially opened.

Furthermore, in order to implement a virtual reality function in a more realistic fashion, fastening members 360 configured to fasten the cell phone in its extended state to the face of a user may be further included. The fastening members 360 may be provided on the casing 310, not on the ocular plate in the form of the earloops of a common mask. The fastening members may be normally prepared on both rear sides of the casing 310, and may be spread backward and fitted around the ears of a user for the convenience of the user.

The fastening members 360 may be provided in the form of the temples of glasses, or may be provided in the form of an elastic band that is fastened to the head of a user.

While the foregoing description has been given with reference to the preferred embodiments of the present invention as described above, it will be understood by those skilled in the art that the present invention may be modified and altered in various manners without departing from the spirit and scope of the present invention set forth in the attached claims.

The invention claim is:

1. A combined virtual reality and cell phone case comprising:
   a casing fixing a cell phone body;
   an ocular plate configured to maintain a variable distance from a rear surface of the casing; and
   a screen-distance adjustment member interposed between the casing and the ocular plate, and configured to move the ocular plate between a retracted state in which the ocular plate comes into close contact with the casing and an extended state in which the ocular plate maintains a predetermined distance from the casing,
   wherein the casing includes an inner frame configured to directly accommodate the cell phone body and a main frame configured to rotatably accommodate the inner frame so that the inner frame is rotatably reversed in accordance with the cell phone body including a main display disposed on the front surface, and, when the ocular plate is in the separated state, the main display of the cell phone body reversed along with the inner frame is oriented rearward and implements a virtual reality function, wherein the cell phone body in the inner frame is rotated with the inner frame on an axis of the main frame.

2. The combined virtual reality and cell phone case of claim 1, wherein the screen-distance adjustment member includes a plurality of screen boxes configured to slide backward and be fixed while being laid over each other.

3. The combined virtual reality and cell phone case of claim 2, wherein the screen boxes are each formed in a double-wall structure including an inner wall and an outer wall spaced apart from the inner wall.

4. The combined virtual reality and cell phone case of claim 3, wherein the screen boxes each include a first vent formed in the inner wall and a second vent formed in the outer wall, and the first vent and the second vent are formed in a non-overlap manner and prevent light from entering from an outside.

5. The combined virtual reality and cell phone case of claim 1, wherein the screen-distance adjustment member comprise:
   a distance adjustment member interposed between the casing and the ocular plate and configured to move the ocular plate between the retracted state and the extended state, and a light blocking screen interposed between the casing and the ocular plate and configured to prevent external light from entering in the extended state of the ocular plate.

6. The combined virtual reality and cell phone case of claim 1, further comprising fastening members configured to fasten the combined virtual reality and cell phone case in the extended state to a face of a user via the ocular plate.

7. The combined virtual reality and cell phone case of claim 1, further comprising a rear cover configured to selectively open and close a rear surface of the ocular plate in the retracted state of the ocular plate.

8. The combined virtual reality and cell phone case of claim 7, wherein a smell generation unit or wind generation unit is mounted on the rear cover.

9. The combined virtual reality and cell phone case of claim 1, wherein the casing includes a through portion corresponding to a virtual reality display in accordance with the cell phone body including a main display disposed on the front surface and the virtual reality display disposed on the rear surface.

* * * * *